(12) United States Patent
Irwin et al.

(10) Patent No.: US 7,232,539 B2
(45) Date of Patent: Jun. 19, 2007

(54) TRIM PRESS, ARTICLE EJECTING DEVICE, TRIM PRESS ARTICLE EJECTOR, AND METHOD OF STACKING AND CLEANING OUT THERMOFORMED ARTICLES

(75) Inventors: Jere F. Irwin, P.O. Box 10668, Yakima, WA (US) 98909-1668; Jeff Berreman, Naches, WA (US); Marian J. Fisk, Naches, WA (US)

(73) Assignee: Jere F. Irwin, Yakima, WA (US)

( * ) Notice: Subject to any disclaimer, the term of this patent is extended or adjusted under 35 U.S.C. 154(b) by 352 days.

(21) Appl. No.: 10/873,551

(22) Filed: Jun. 21, 2004

(65) Prior Publication Data

US 2005/0037107 A1 Feb. 17, 2005

Related U.S. Application Data

(60) Provisional application No. 60/480,145, filed on Jun. 20, 2003.

(51) Int. Cl.
*B29C 41/42* (2006.01)
*B29C 45/40* (2006.01)

(52) U.S. Cl. ...................... 264/334; 425/444

(58) Field of Classification Search ............... 425/444, 425/556; 264/334
See application file for complete search history.

(56) References Cited

U.S. PATENT DOCUMENTS

| | | | | | |
|---|---|---|---|---|---|
| 228,649 | A | * | 6/1880 | Martin | 24/28 |
| 1,639,840 | A | * | 8/1927 | Miller | 264/334 |
| 3,692,456 | A | * | 9/1972 | Foster | 425/412 |
| 4,552,525 | A | * | 11/1985 | Stehr | 425/422 |
| 5,031,439 | A | * | 7/1991 | Riedisser et al. | 72/345 |
| 5,067,892 | A | * | 11/1991 | Rahn et al. | 425/556 |
| 5,806,745 | A |   | 9/1998 | Irwin | 226/74 |
| 6,067,886 | A |   | 5/2000 | Irwin | 83/615 |

* cited by examiner

*Primary Examiner*—Yogendra N. Gupta
*Assistant Examiner*—Emmanuel S. Luk
(74) *Attorney, Agent, or Firm*—Wells St. John P.S.

(57) ABSTRACT

An article ejector is provided having kinematic linkages that drive ejector paddle assemblies in an article ejector mode, as well as a die cleaning mode where the kinematic linkages are driven via rotary motion in a continuous clockwise direction, in both modes, without having to impart changes in direction for the rotary drive mechanisms, and while maintaining maximum mechanical advantage of the kinematic linkages. A method is also provided.

30 Claims, 11 Drawing Sheets

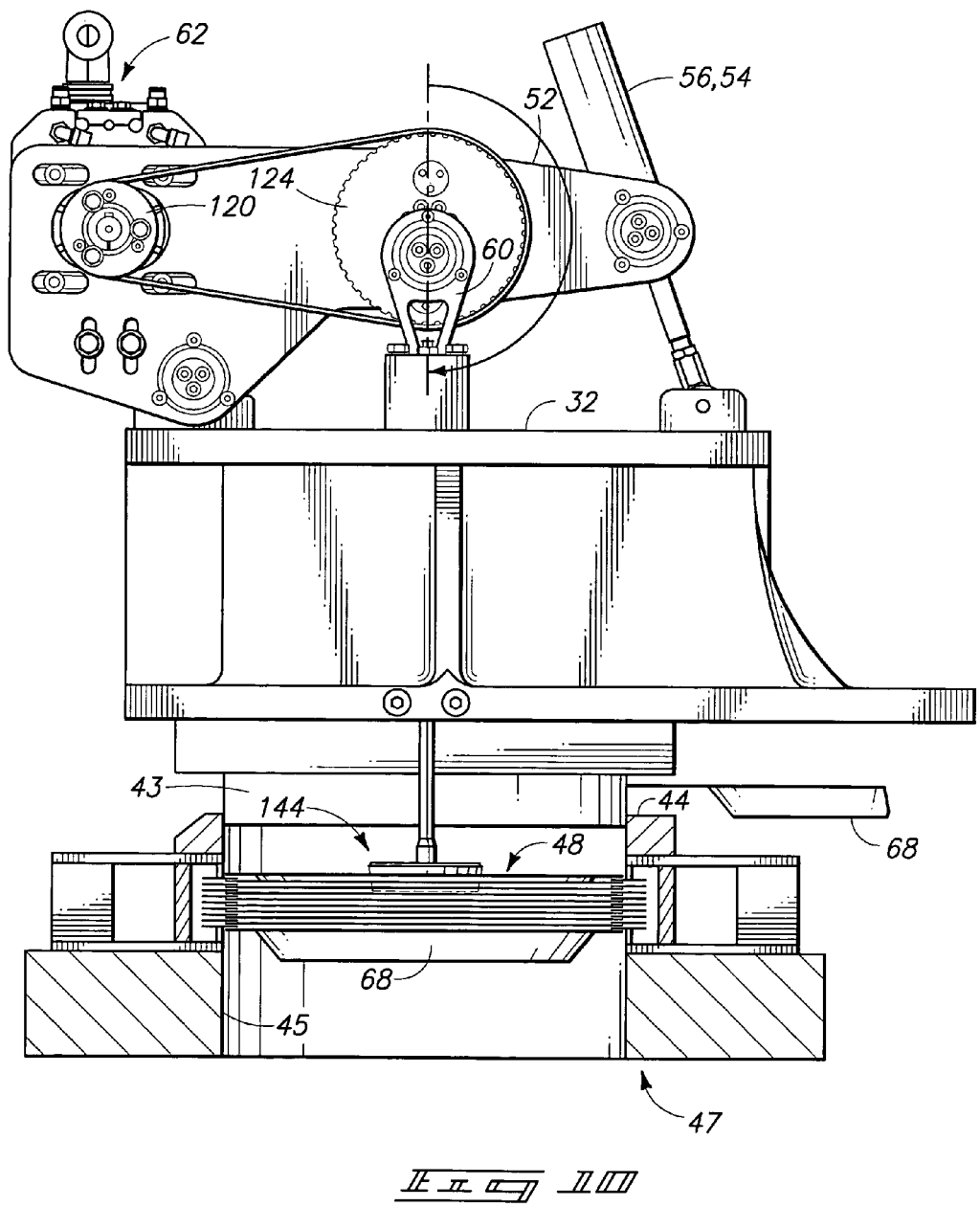

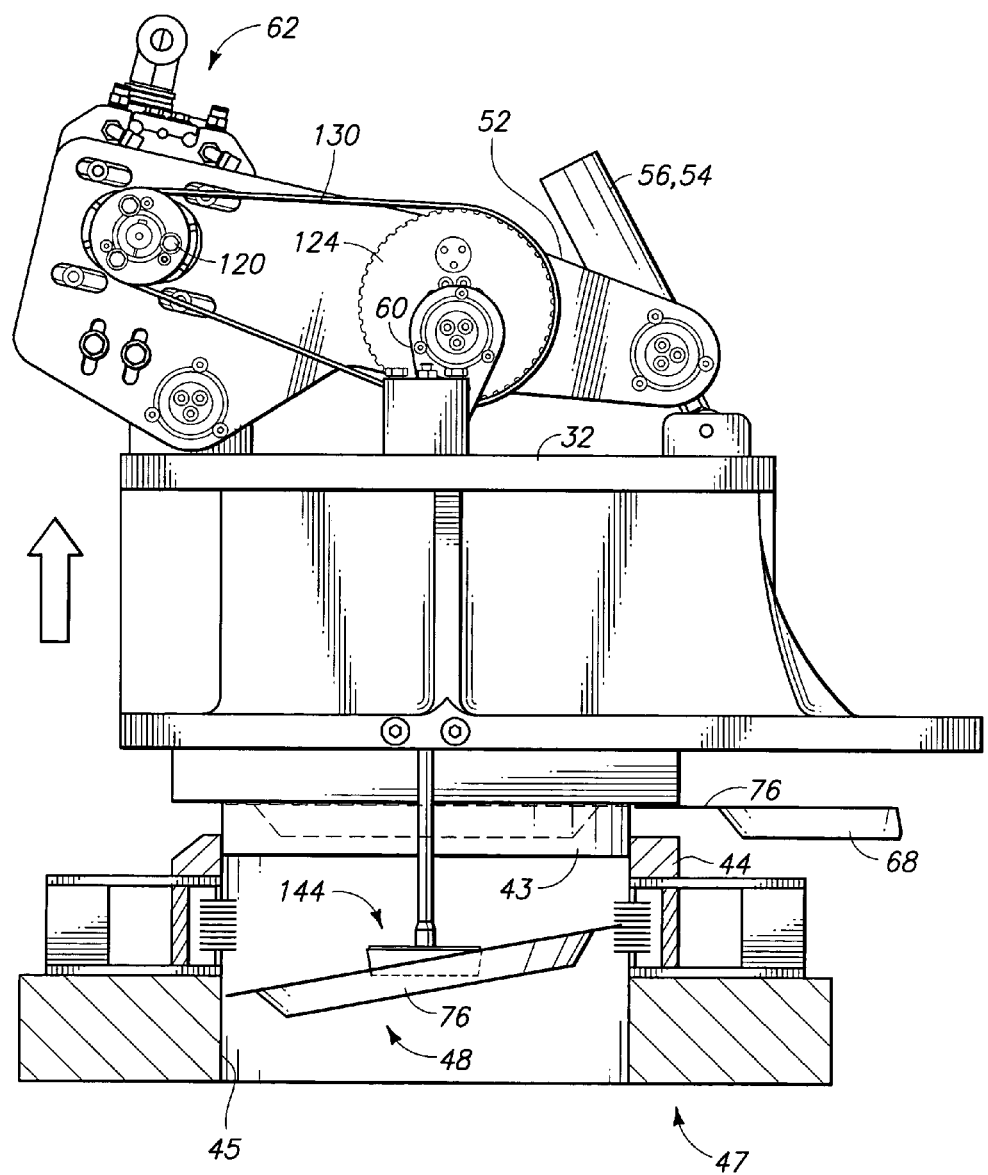

TRIM PRESS, ARTICLE EJECTING DEVICE, TRIM PRESS ARTICLE EJECTOR, AND METHOD OF STACKING AND CLEANING OUT THERMOFORMED ARTICLES

RELATED PATENT DATA

This application claims priority from U.S. Provisional Patent Application Ser. No. 60/480,145, which was filed on Jun. 20, 2003, and which is incorporated by reference herein.

TECHNICAL FIELD

This invention pertains to apparatus for separating and ejecting thin-walled articles from a sheet of thermoformable plastic material in which the articles have been formed using a thermoforming press. More particularly, the present invention relates to a trim press article-ejecting apparatus, such as an article, or product, ejector.

BACKGROUND OF THE INVENTION

Numerous techniques are known for separating thin-walled thermoformed articles from sheets of thermoformable plastic material. The trimming of thermoformed articles from a continuous web or sheet of thermoformable plastic material has long been known in the art. It has been known to form and sever articles from webs of both solid and foamed-plastic material.

Using a thermoforming process, articles are molded into a heated material web using a thermoforming machine. A heated web of material is transported through the thermoforming machine where articles are then formed in the web. The web is then transported from the thermoforming machine at a relatively high operating speed into a trim press where the articles are severed from the web of plastic material.

Typically, a trim press includes cooperating male and female members, each member having cooperating cutting surfaces, such as complementary punches and dies that correspond with an outer configuration of the formed articles. Such pairs of punches and dies are adapted to cooperate and trim individual articles from the web as they are brought together on opposite sides of the web by the trim press. Recently, attempts have been made to further increase the operating speed of trim presses. Such increases in operating speed can lead to significant increases in throughput and article output. Accordingly, relatively high-speed trim presses have been developed that generate a continuous horizontally-nested stack of articles which are slid onto a platform, or packing table. However, increases in operating speed have caused some problems in that a vacuum is created when drawing apart platens of a trim press which can actually suck severed articles or scrap web material back up into the trim press dies, which can create a jam or problem when running the trim press at relatively high operating speeds.

FIGS. 7–8 illustrate one prior art solution in the form of an article accumulator 250 that is mounted onto a trim press similar to the trim press depicted with reference to FIG. 1 wherein article ejector 250 substitutes for the new article ejector that is described with reference to FIGS. 1–6 and 9–11, as described in the Detailed Description, below. For the case of the prior art article ejector 250, a support frame 252 is secured to a top face of an upper platen (not shown), such as the upper platen depicted with reference to FIGS. 1 and 2. Support frame 252 is secured via four mounting blocks 336, 338, 340, and 342 via threaded fasteners. A pair of vertical die posts 312 and 314 are also supported within the upper platen via fastener collars 332 and 334. Die posts 312 and 314 are rigidly and vertically secured within the upper platen. An ejector bridge 310 is supported by a bushing assembly 316 and 318 at each end for vertical up and down reciprocation along die posts 312 and 314. A plurality of ejector paddle assemblies depend downwardly from ejector bridge 310, such as ejector paddle assembly 344, for ejecting articles that are severed between male and female dies of a trim press into an accumulator cavity, where the articles are stacked and accumulated for delivery to a conveyor.

According to the construction of prior art article ejector 250, a servo motor 262 drives a drive pulley 320 which further drives a driven pulley 324 via a timing belt 330. Driven pulley 324 is rigidly affixed onto a drive shaft 308 in order to drive a driven wheel 322 at its opposite end. Wheel 322 and pulley 324 each pivotally support one end of a crank arm 326 and 328, respectively. Crank arms 326 and 328 are fixed with bearings at opposite ends to mounting positions on ejector bridge 310 so as to drive ejector bridge 310 and paddle assemblies 344 up and down so as to eject and clear product from between dies of a trim press during operation.

As shown in FIG. 7, support frame 252 includes side plates 300 and 302 which are joined together via rigid cross-shafts 304 and 306.

Article ejector 250, according to prior art techniques, is run in two operating modes. First, article ejector 250 is normally run to downwardly press (or eject) severed articles from dies and into a stack within an article accumulator (not shown). During such normal operating mode, pulley 324 and wheel 322 are driven between a 12:00 o'clock and 3:00 o'clock position by driving drive pulley 320 back and forth in clockwise and counter-clockwise directions, respectively, via operation of servo 262. Accordingly, crank arms 326 and 328 are only driven to half their maximum displacement position as dictated by the attachment points in the diameters on wheel 322 and pulley 324.

Another operating mode is desired in order to eject plastic material or damaged articles when there has been a misfeed or jam in a trim press. During such an operating mode, it is desirable to more deeply and fully stroke paddle assemblies into the female bores beneath a female die to eject any waste or damaged articles or material to clean out the trim press dies and cavities. In order to achieve such a result, the prior art techniques provided by article ejector 250 require operation of servo motor 252 to drive wheel 322 and pulley 324 between the 12:00 o'clock and 6:00 o'clock positions by driving drive pulley 320 in respective clockwise and counter-clockwise directions.

Accordingly, the two operating modes require that normal operation occur between a 12:00 o'clock and 6:00 o'clock position on pulley 324 which does not provide maximum stroke for a given amount of mechanical advantage as provided by the accompanying kinematic linkages (and in the first operating mode). Secondly, the clockwise and counter-clockwise reciprocating motion of the kinematic linkages in servo motor 262 is not efficient or optimal for high-speed operation. The associated moments of inertia are undesirable for relatively high operating speeds because the associated masses of the kinematic components suddenly change (or reverse) direction at high speed, which is undesirable and creates imbalance forces and increasing loading at component connections.

Accordingly, improvements are needed to provide a more efficient and high-speed article ejector for a high-speed thermoforming trim press. Furthermore, it is desirable to provide more optimal use of kinematic linkages and to reduce the negative effects of inertial operating forces to increase the operating speed and effectiveness of an article ejector.

SUMMARY OF THE INVENTION

An article ejector is provided having kinematic linkages that drive ejector paddle assemblies in an article ejector mode, as well as a die cleaning mode where the kinematic linkages are driven via rotary motion in a continuous clockwise direction, in both modes, without having to impart changes in direction for the rotary drive mechanisms, and while maintaining maximum mechanical advantage of the kinematic linkages.

According to one aspect, a trim press is provided having a first platen, a second platen, an article accumulator, and an article ejector. The first platen has at least one male die. The second platen has at least one female die. The article accumulator has a flywheel drive mechanism configured to rotate in a continuous forward direction with an offset crank arm configured to drive at least one ejector paddle to and fro. The at least one ejector paddle ejects articles from the female die into the cavity in a first mode of operation.

According to another aspect, an article ejecting device includes a platen, an articulating frame, an article ejector; and a frame moving mechanism. The articulating frame is carried for movement by the platen between an article stacking position and an article ejecting position. The article ejector mechanism is movably carried by the frame between a retracted position and an extended position. The frame moving mechanism is configured to move the frame and the article ejector mechanism between an article stacking position and an accumulator cavity clean-out position.

According to yet another aspect, a trim press article ejector is provided with a base, an articulating frame, an actuator, and an article ejector. The articulating frame is carried by the base. The actuator is coupled with the frame and is operative to move the frame between extended and retracted positions relative to the base. The article ejector is carried by the frame and has at least one paddle movable to and fro to eject articles from a trim press die. The extended position of the frame places the article ejector in an article stacking position. The retracted position of the frame places the article ejector in a clean-out position.

According to yet even another aspect, a method is provided for stacking and cleaning out thermoformed articles. The method includes: providing a trim press having a first platen with at least one male die and a second platen with at least one female die, the first and second platens movably supported to and fro therebetween, an article ejector supported on the first platen via an articulating frame, and an article accumulator having at least one cavity communicating with the female dies; positioning the articulating frame in a first position corresponding with the article accumulator configured in an article stacking position; stacking one or more articles by reciprocating the article ejector to and fro while the articulating frame is in the first position; positioning the articulating frame in the second position corresponding with the article accumulator configured in a clean out position; and cleaning out the at least one cavity of the article accumulator by reciprocating the article ejector to and fro while the articulating frame is in the second position.

One advantage is to reduce sudden changes in direction of kinematic components on an article ejector for a trim press which will impart undesirable inertial forces to the machine that can limit overall operating speed and performance.

Another advantage is to provide continuously rotating kinematic components that have a mass that is configured to store energy as a fly wheel such that rotation of the kinematic linkages does not oscillate between clockwise and counterclockwise directions.

BRIEF DESCRIPTION OF THE DRAWINGS

Preferred embodiments of the invention are described below with reference to the following accompanying drawings.

FIG. 10 is a simplified side view of the article ejector of FIG. 9, but illustrating the article ejector with the ejector paddles positioned to eject a newly severed article into a stack of articles within the article accumulator, corresponding with maximum displacement of the ejector paddles while in a normal operating mode;

FIG. 11 illustrates the article accumulator of FIGS. 9–10 for a cleanout mode of operation wherein the article ejector frame has been downwardly articulated to further increase stroke of the ejector paddles to clean out scrap or damaged product or film material from within the female dies of the article accumulator.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Reference will now be made to a preferred embodiment of Applicant's invention. An exemplary implementation is described below and depicted with reference to the drawings comprising an article ejector and method for ejecting articles and material from a die assembly in an article accumulator of a thermoforming trim press.

While the invention is described by way of the preferred embodiment, it is understood that the description is not intended to limit the invention to this embodiment, but is intended to cover alternatives, equivalents, and modifications which may be broader than this embodiment, such as are included within the scope of the appended claims.

Furthermore, in an effort to prevent obscuring the invention at hand, only details germane to implementing the present invention will be described in great detail. Presently understood peripheral details will be incorporated by reference, as needed, as being presently understood in the art.

Figure 1:
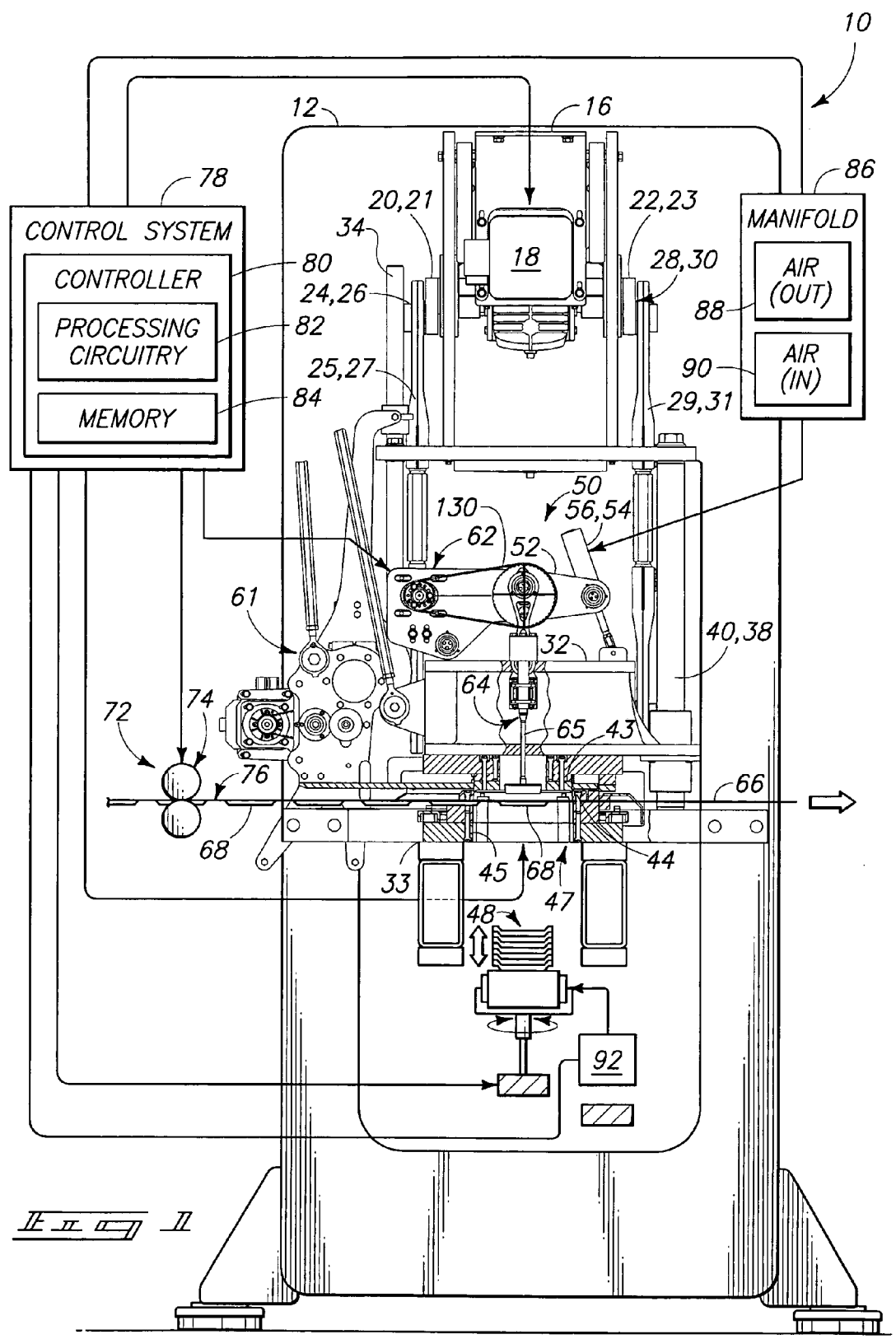
FIG. 1 is a vertical side view of a thermoforming machine trim press having an article ejector embodying one aspect of the invention.

A preferred embodiment of Applicants' invention is shown implemented on a thermoforming machine trim press 10, wherein the invention is generally designated with reference numeral 50 in FIG. 1. An article ejector 50 is mounted atop an upper platen 32 of trim press 10 for ejecting individual articles 68 from within an article cavity 45 from within a female die 44 of a lower platen 33. Articles 68 are severed from a web 76 of thermoformable plastic material as the web is advanced by a web conveyor 72 via a conveyor chain drive system 74 that is identified in simplified form as a pair of co-acting drive rollers provided on opposite edges of web 76. A treadle 61 (partially shown) also advances the web 76 into trim press 10.

A control system 78 choreographs operation of trim press 10 along web conveyor 72 in order to move web 76 of thermoformed plastic material in which individual articles, or products, 68 have been previously formed using a thermoforming machine (not shown). In operation, web 76 is driven in intermittent motion under the control of control system 78 in order to intermittently feed individual rows of articles 68 for severing from web 76 using trim press 10. In one case, there are five articles 68 within a single row of web 76.

An article accumulator 47 is provided on trim press 10 in order to accumulate severed articles 68 into individual stacks 48. Stacks 48 are intermittently deposited atop an article conveyor 46 for delivery to a packaging machine. Such stacks 48 of articles 68 are then loaded into individual packages or plastic bags. According to one implementation, conveyor 46 is intermittently activated to move stacks 48 of articles 68 for delivery to a bagging system (not shown) once desired stack sizes have been realized atop conveyor 46.

As shown in FIG. 1, web conveyor 72 is illustrated in simplified form as a drive wheel assembly, even though it is actually a chain drive 74, including servo motors that are controllably actuated via control system 78 to impart intermittent motion to web 76. Accordingly, intermittent actuation of chain drive 74 via control system 78 is operative to intermittently deliver rows of articles 68 into trim press 10. Such rows of articles 68 are then severed as control system 78 actuates a severing operation via trim press 10. Subsequently, scrap web 66 is delivered from trim press 10 and ground into small pieces using a plastic comminuting device configured for grinding up scrap web 66.

It is understood that article conveyor 72 is shown in simplified form. One exemplary detailed construction for article conveyor 72 is disclosed in U.S. Pat. No. 5,806,745, issued Sep. 15, 1998, entitled "Adjustable Conveyor for Delivering Thin Web Materials", naming Jere F. Irwin as inventor, and which is incorporated by reference herein.

Figure 2:
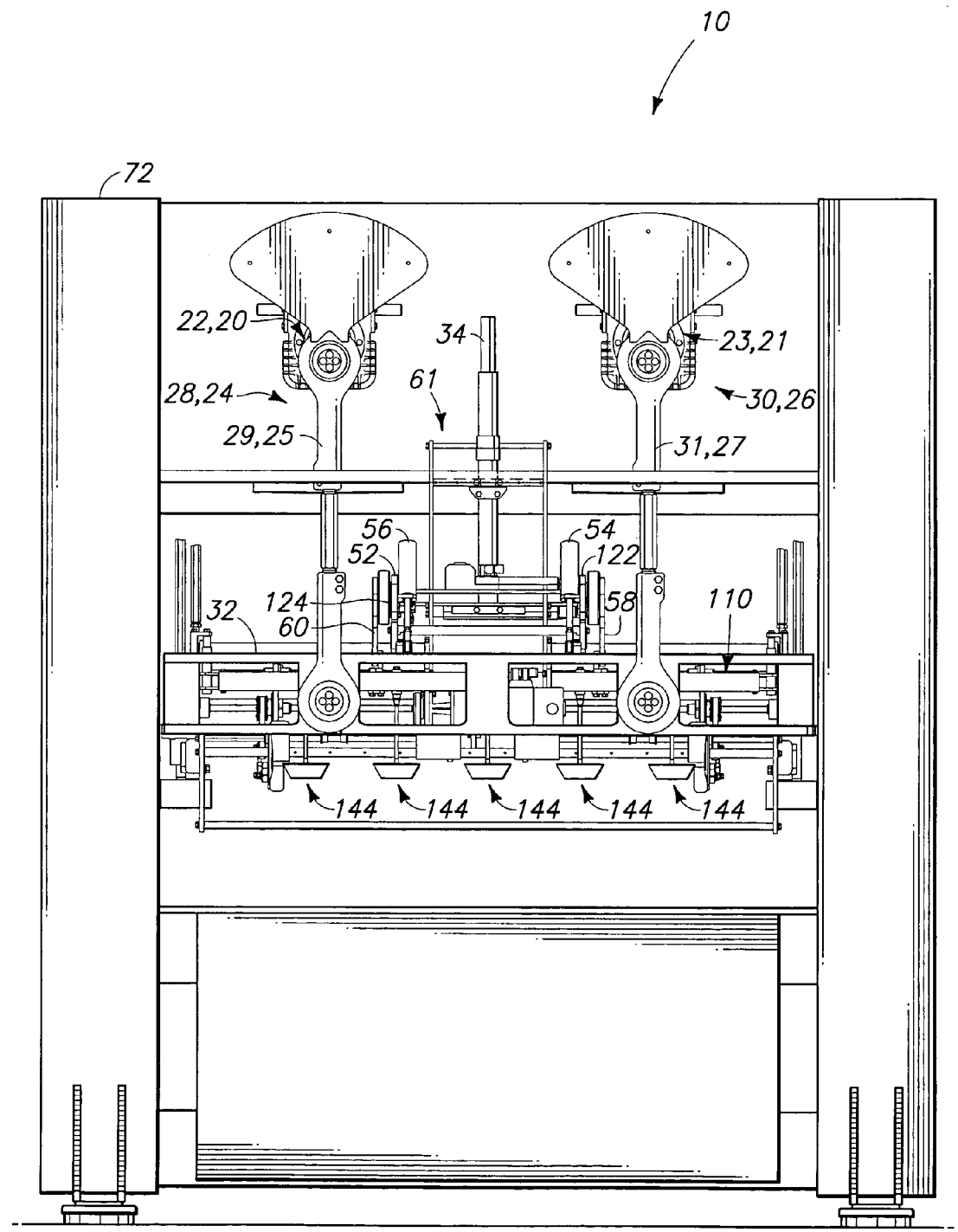
FIG. 2 is a simplified vertical front view of the thermoforming machine trim press and article ejector of FIG. 1 taken from a right side of FIG. 1, omitting some components in a lower portion of the trim press to emphasize the article ejector assemblies.

As shown in FIGS. 1 and 2, trim press 10 includes a frame 12 including frame members 14 that support a servo drive motor 18 and a gear box 16. Motor 18 and gear box 16 drive a movable upper platen 32 via throw arms 20, 21 and 22, 23 which drive crank arm assemblies 24, 26 and 28, 30, respectively, to raise and lower upper platen 32. A pair of main die posts 38 and 40 guide upper platen 32 in up and down motion via associated bushings (not numbered), as well as via a tool die post 34. Details of one exemplary thermoforming machine having such crank arm assembly for moving an upper platen and having counterbalance features are shown in U.S. Pat. No. 6,067,886, issued May 30, 2000, entitled "Machine Trim Press Having Counterbalance Features", naming Jere F. Irwin as inventor, and which is incorporated by reference herein.

Each crank arm assembly 24, 26, 28 and 30 comprises a throw arm 20-23, respectively, and a platen connecting rod 25, 27 and 29, 31, respectively. For example, arm 20 and rod 25 cooperate to form a kinematic linkage that drives a dedicated corner of platen 32 for vertical, guided reciprocation. Additionally, main die posts 38 and 40 are rigidly carried in a stationary position by frame 12 to support platen 32 for movement in an axial, vertical direction. Article ejector 50 includes an articulating frame 52 that can be positioned between a raised and lowered position via a pair of pneumatic cylinders 54 and 56. In a normal operating mode, articulating frame 52 is provided in a raised position for downwardly ejecting articles 64 that have been severed into cavity 45 of article accumulator 47 for storage and stacking therein. In a second operating mode, cylinders 54 and 56 are retracted so as to lower frame 52 to a downward position in order to increase stroke of an ejector bridge assembly 64 to increase stroke of a plurality of individual ejector paddle assemblies 144 to clean damaged parts and web material from dies 43, 44 and cavity 45.

Control system 78 includes controller 80. Controller 80 includes processing circuitry 82 and memory 84. According to one construction, processing circuitry 82 is provided by a microcontroller. Alternatively, processing circuitry 82 is provided by a central processing unit (CPU). It is understood that memory 84 is operative to store software subroutines that are retrieved and implemented on processing circuitry 82 in order to impart motion control functionality by way of controller 80 to servo motors, motors, and components that operate trim press 10 including article conveyor 46, article accumulator 47, and article ejector 50. Furthermore, control system 78 sends control signals to a pneumatic manifold (or supplies of compressed air) 86 to control delivery of air 88 and air 90 to extend and retract pneumatic cylinders 54 and 56 in a controlled manner to shift between two operating states for article ejector 50.

In operation, individual male dies 43 are supported on a die plate 42 for co-action with female dies 44 above lower platen 33. Such co-action severs articles 68 from web 76.

Control system 78 further controls operation of servo motor 62 of article ejector 50 in order to control the movement of crank arm assemblies 58 and 60 which direct movement of ejector paddle assemblies 144 downwardly to push down severed articles 68 into cavity 45 for collection. Likewise, control system 78 further imparts control to a servo drive 92 for article conveyor 46 to advance articles (as well as ejected scrap material) from beneath conveyor 10 to another station. In one case, scrap material is ejected in one direction whereas stacks 48 of accumulated articles 68 are ejected in an opposite direction for collection and bagging. Furthermore, control system 78 can regulate raising and lowering of article conveyor 46 via control signals.

Figure 3:
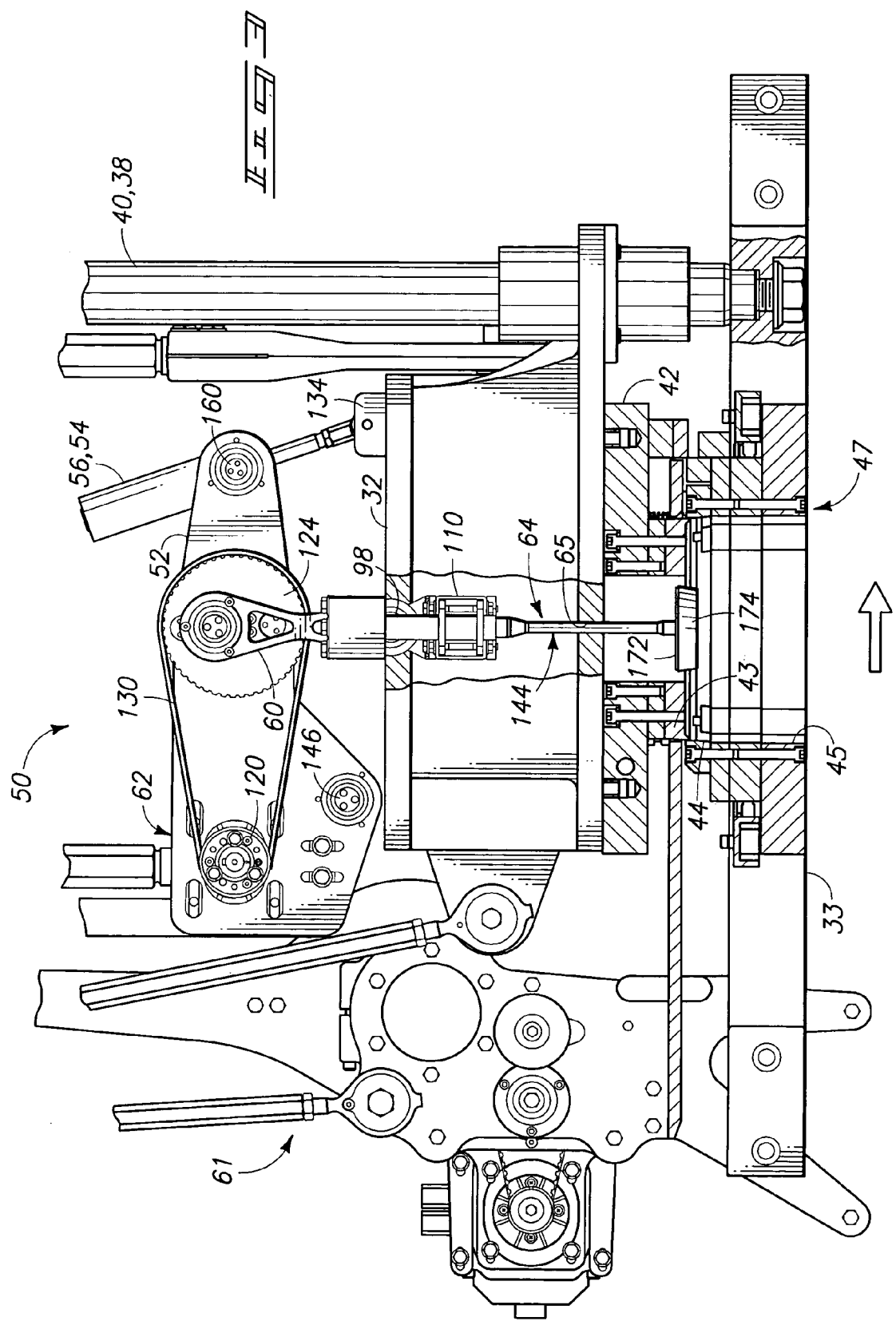
FIG. 3 is an enlarged partial, vertical side view of the article ejector of FIG. 1 further illustrating construction of the article ejector in partial vertical sectional view.

FIG. 3 illustrates the positioning of article ejector 50 in a fully upwardly retracted position when upper platen 32 is lowered into engagement with lower platen 33 during a severing operation of a web (not shown) when male die 43 co-acts with female die 44 to sever an article, but prior to extending ejector paddle assemblies 144 in a downward direction to eject articles into corresponding cavities 45 within an article accumulator 47. As shown in FIG. 3, ejector paddle assembly 144 is in a fully raised position and article ejector 50 has frame 52 in a fully raised position in a first operating state. Accordingly, cylinders 54 and 56 are shown in an extended position so as to raise frame 52 which further raises crank arm 60 and ejector paddle assemblies 144 to a fully elevated position. Upper platen 32 is shown supported for vertical reciprocation via die posts 38 and 40 such that upper platen 32 can be raised after severing articles between dies 43 and 44.

A plurality of male dies 43 are provided spaced apart along a die plate 42 that is secured with fasteners to a bottom surface of upper platen 32. Each ejector paddle assembly 144 is configured to move for vertical axial reciprocation along a bearing surface 65 provided in association with upper platen 32 and die plate 42. Accordingly, the array of ejector paddle assemblies 144 provides an ejector bridge assembly 64 that is supported by upper platen 32.

Servo motor 62 is actuated to rotate drive pulley 120 to rotate driven pulley 124 via drive belt 130 in one circular, forward direction. Accordingly, crank arm assembly 60 is mounted at an off-center position on pulley (or wheel) 124 such that crank arm 96 is driven as pulley 124 rotates completely circumferentially in a clockwise direction (as shown in FIG. 3). Crank arms 58 and 60 are each mounted at opposite ends with bearing fastener assemblies 96 and 98. For example, crank arm 58 is mounted at one end to pulley 124 as well as at another end to a top portion of an ejector bridge 110.

As shown in the fully raised configuration depicted in FIG. 3, each ejector paddle assembly 144 is made substantially of aluminum components, including a cylindrical distal end paddle 172 upon which a resilient foam pad 174 is affixed for engaging and contacting severed articles before ejecting articles into cavity 145.

As shown in FIG. 3, cylinder 56 is affixed at one actuating end via a bearing mount 160 and at a distal, opposite end via a mounting block 134 to a top portion of upper platen 32.

Figure 4:
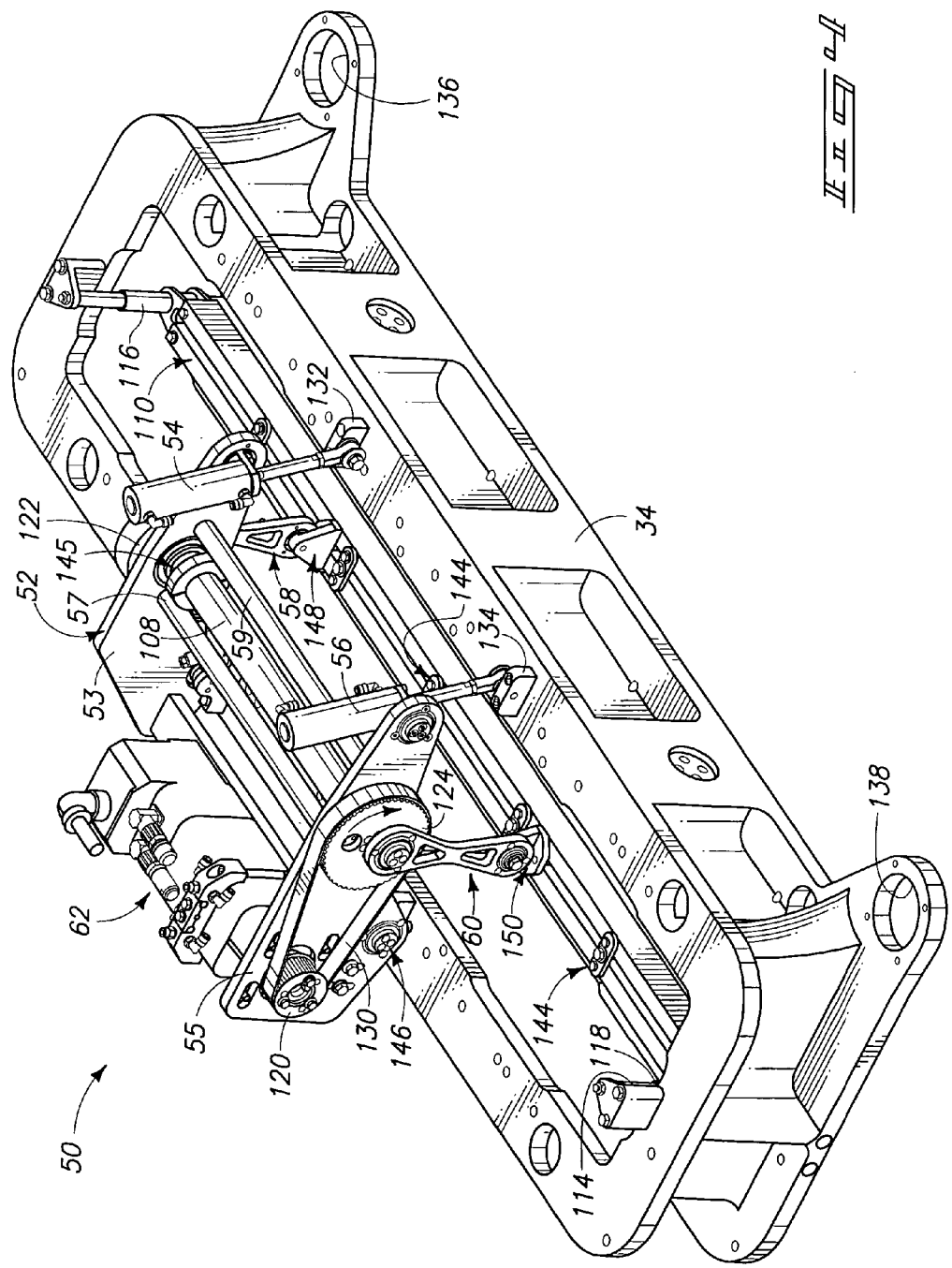
FIG. 4 is a perspective view of the upper platen and article ejector of FIGS. 1–3.

As shown in FIG. 4, ejector bridge 110 is supported for vertical movement up and down within upper platen 32 by way of alignment posts 112 and 114 that are mounted at either end to inner surfaces of upper platen 32. A bronze bushing assembly 116 and 118 is provided at opposite ends of ejector bridge 110 to provide for vertical axial aligned movement of ejector bridge 110 along posts 112 and 114. Spaced along ejector bridge 110 are a plurality of ejector paddle assemblies 144, each configured to align with a respective female die and a lower platen for ejecting severed articles into respective cavities provided therebelow in an article accumulator (not shown).

As shown in FIG. 4, bearing mounting bores 138 and 140 are provided for receiving bearings that ride on main die posts 38 and 40, respectively.

As shown in FIG. 4, articulating frame 52 on article ejector 50 includes a pair of side plates 53 and 55 that are rigidly affixed together by way of a pair of cross-posts 57 and 59. A drive shaft 108 is supported for rotation by way of two bearing assemblies between side plates 53 and 55, and is driven by driven pulley 124 via belt 130 and drive pulley 120. Accordingly, a wheel 122 is driven for rotation at an opposite end of shaft 108 from pulley 124. Wheel 122 drives crank arm 58, whereas pulley 124 drives crank arm 60. Hence, ejector bridge 110 is driven vertically upwardly and downwardly for vertical reciprocation as guided by way of posts 112 and 114 at either end.

More particularly as shown in FIG. 4, a lower end of each crank arm 58 and 60 is attached by way of a bearing assembly to a respective mounting bracket 148 and 150 that is provided along ejector bridge 110. Furthermore, ejector paddle assemblies 144 (numbering five, in this case) are mounted in spaced-apart relation along ejector bridge 110.

As shown in FIG. 4, articulating ejector 50 is illustrated with frame 52 rotated up to a raised position by way of extending pneumatic cylinders 54 and 56. Distal ends of cylinders 54 and 56 are pivotally affixed to mounting blocks 132 and 134 atop upper platen 32.

In the raised configuration of frame 52, crank arms 58 and 60 are able to move ejector bridge 110 up and down a distance of stroke that is defined by the upper and lower positions of crank arm 60 provided by the offset mounting portion of crank arm 60 off-center on pulley 124 and wheel 122. By moving the attachment of the crank arm connection points for crank arms 59 and 60 between 12:00 o'clock and 6:00 o'clock positions, a full depth of stroke for ejector bridge 112 is defined under a first mode of operation where articles are driven downwardly to eject the articles into an accumulation device for stacking or accumulating under normal article stacking operations.

In another mode of operation (a cleanout mode), pneumatic cylinders 54 and 56 are retracted so as to lower frame 52 via pivoting at pivot bearing assemblies 145 and 146. Accordingly, the upper attachment point for crank arms 58 and 60 is substantially lowered, which enables deeper draw of ejector paddle assemblies 144 (see FIG. 3) within the cavity for each article. Such second mode of operation is particularly useful when a piece of thermoformable web material or damaged article has become misaligned or trapped between the dies or within the article cavity. When this happens, an operator retracts cylinders 54 and 56 and drives crank arms 58 and 60 to the lowered position to eject the damaged or unwanted material from the cavities and the die in the article accumulator. Afterward, an article conveyor provided therebelow can be moved in a direction opposite the direction that is normally used to remove stacked articles (for bagging at a bagging station) for processing of the damaged or waste material into a comminuting device or storage bin.

Figure 7:
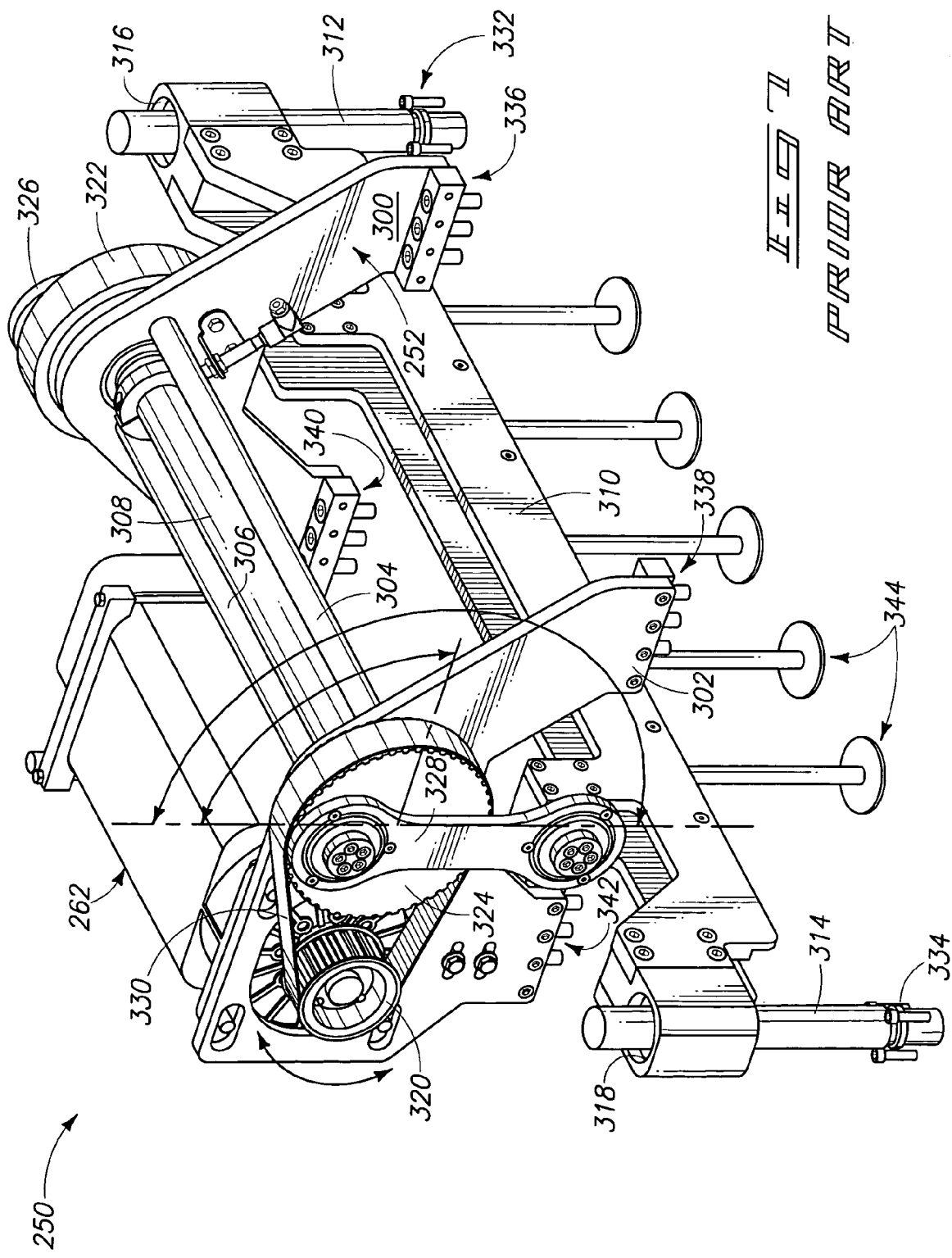
FIG. 7 is a perspective view of a prior art article ejector configured for mounting on a top platen of a thermoforming machine similar to the thermoforming machine depicted in FIGS. 1–2.
Figure 8:
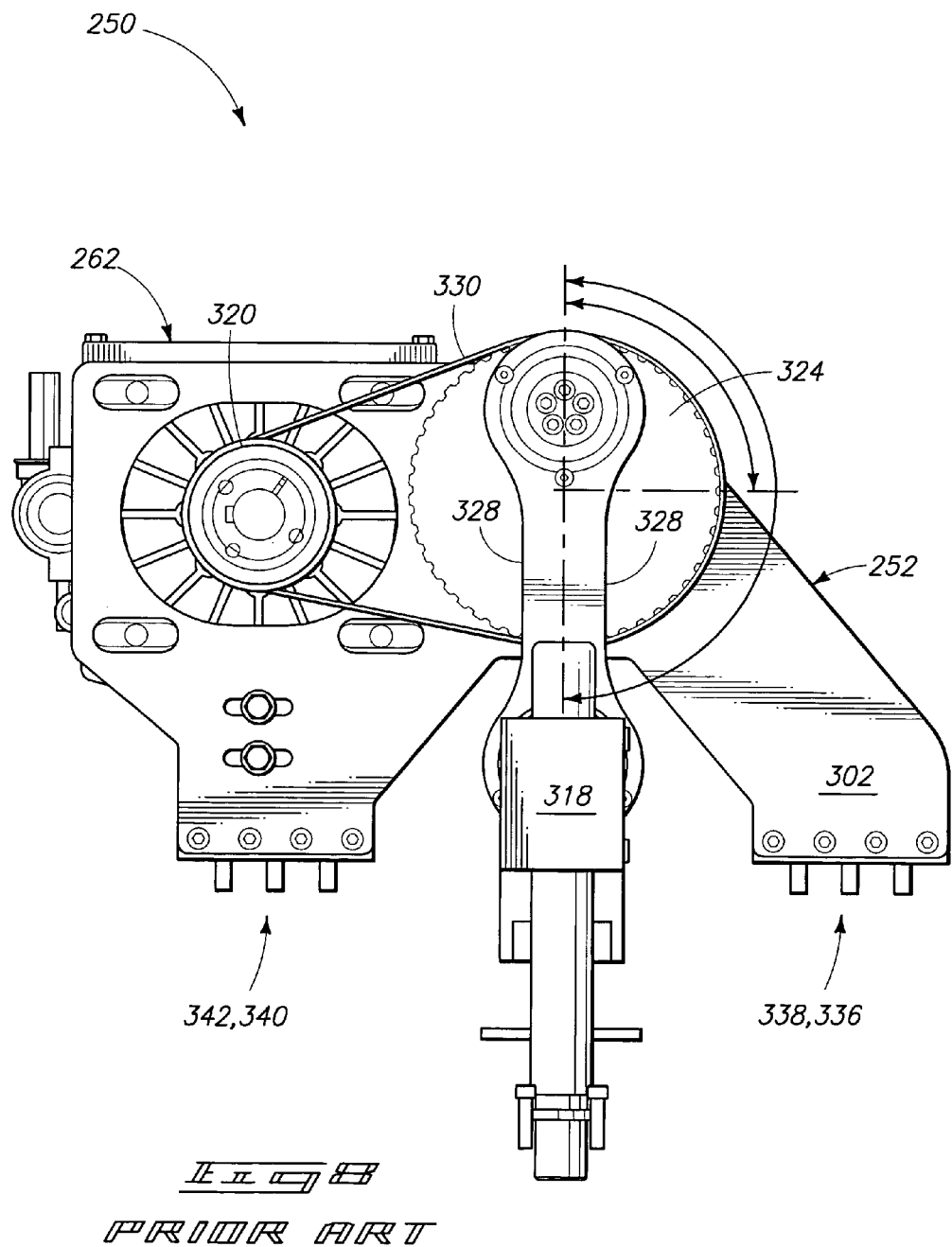
FIG. 8 is a left end view of the prior art article ejector of FIG. 7.

As shown in FIG. 4, servo motor 62 drives pulley 120 so as to further drive crank arms 58 and 60 in a clockwise, or forward, direction. Preferably, the majority of the support components making up article ejector 50 are made from as light a material as possible, such as from aluminum. Others are made of steel (such as fasteners). However, the rotary motion of pulley 124, wheel 122, and shaft 108 continues to rotate in a continuous, same rotational direction. Accordingly, their motion acts as a fly wheel that maintains a single rotating direction. In contrast, the prior art system of FIGS. 7–8 rotates alternative assemblies back and forth which can significantly create problems because of the change in direction of the moving masses. This will not allow the prior art article ejector to operate in as smooth a manner or as fast an operating speed because of the changing in direction of the mass of the associated rotating components.

Figure 5:
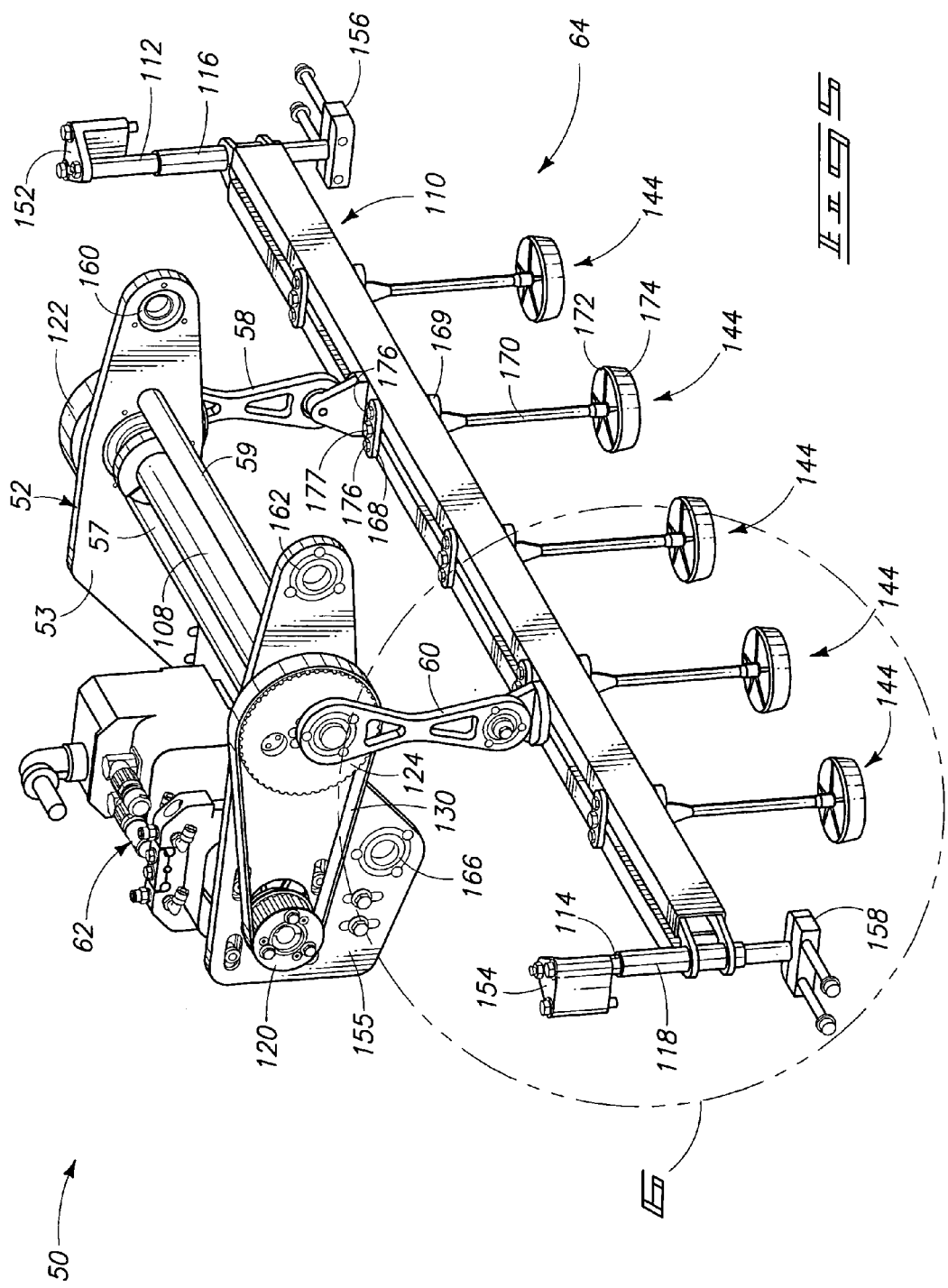
FIG. 5 is a perspective view of the article ejector of FIG. 4, but with the upper platen removed.

FIG. 5 illustrates in greater detail the article ejector 50 as removed from the upper platen (of FIG. 4). Accordingly, the mounting of ejector paddle assemblies 144 along ejector bridge 110 can be more readily seen. Preferably, crank arms 58 and 60, ejector bridge 110, and the structural components of ejector paddle assembly 144 are all formed from lightweight material, such as aluminum to reduce moving moments of inertia.

As shown in FIG. 5, ejector paddle assembly 144 comprises a perforated, cylindrical paddle 172 carried at the bottom end of a mounting rod 170 that is affixed at an upper end to mate with a threaded fastener 177, wherein upper and lower brackets 168 and 169 clamp on the top and bottom faces of ejector bridge 110 as threaded fastener 177 is received into a complementary, corresponding threaded bore at the top end of rod 170. Accordingly, ejector paddle assembly 144 is rigidly affixed to depend below ejector bridge 110. Furthermore, a pair of threaded fasteners 177 further secure together brackets 168 and 169 to bridge 110.

At a bottom end of paddle 172, a relatively lightweight foam pad, or plug, is provided for engaging with articles as the articles are being driven downwardly by paddle 172 and pad 174 during an article ejection process, or during a cleaning process when cleaning out jammed material or damaged articles from within a cavity within the die or within an article accumulator therebelow.

As shown in FIG. 5, upper brackets 152 and 154 are mounted along a top edge of the upper die (not shown). Similarly, bottom brackets 158 and 160 are mounted to an inner surface of the upper die in order to vertically affix die posts 112 and 114.

As further shown in FIG. 5, a pair of ball bearings 160 and 162 are provided at the actuating end of frame 52, recessed within side plates 53 and 55. Furthermore, additional bearings, such as bearing 166, are provided at the points where frame 52 pivots atop the upper platen (not shown). Also as shown in FIG. 5, frame 52 forms a rigid support structure by way of side plates 53 and 55 being rigidly affixed together by way of cross-posts 57 and 59. Accordingly, drive shaft 108 is supported at each end by a bearing (not shown) to enable continuous rotary motion of pulley 124 and wheel 122 in a single clockwise direction. Alternatively, the wheel 122 and pulley 124 can be driven only in a counter-clockwise direction, where movement starts and stops, but direction of rotation does not change as article ejector 50 is actuated down and up, intermittently, during article ejection stages.

Figure 6:
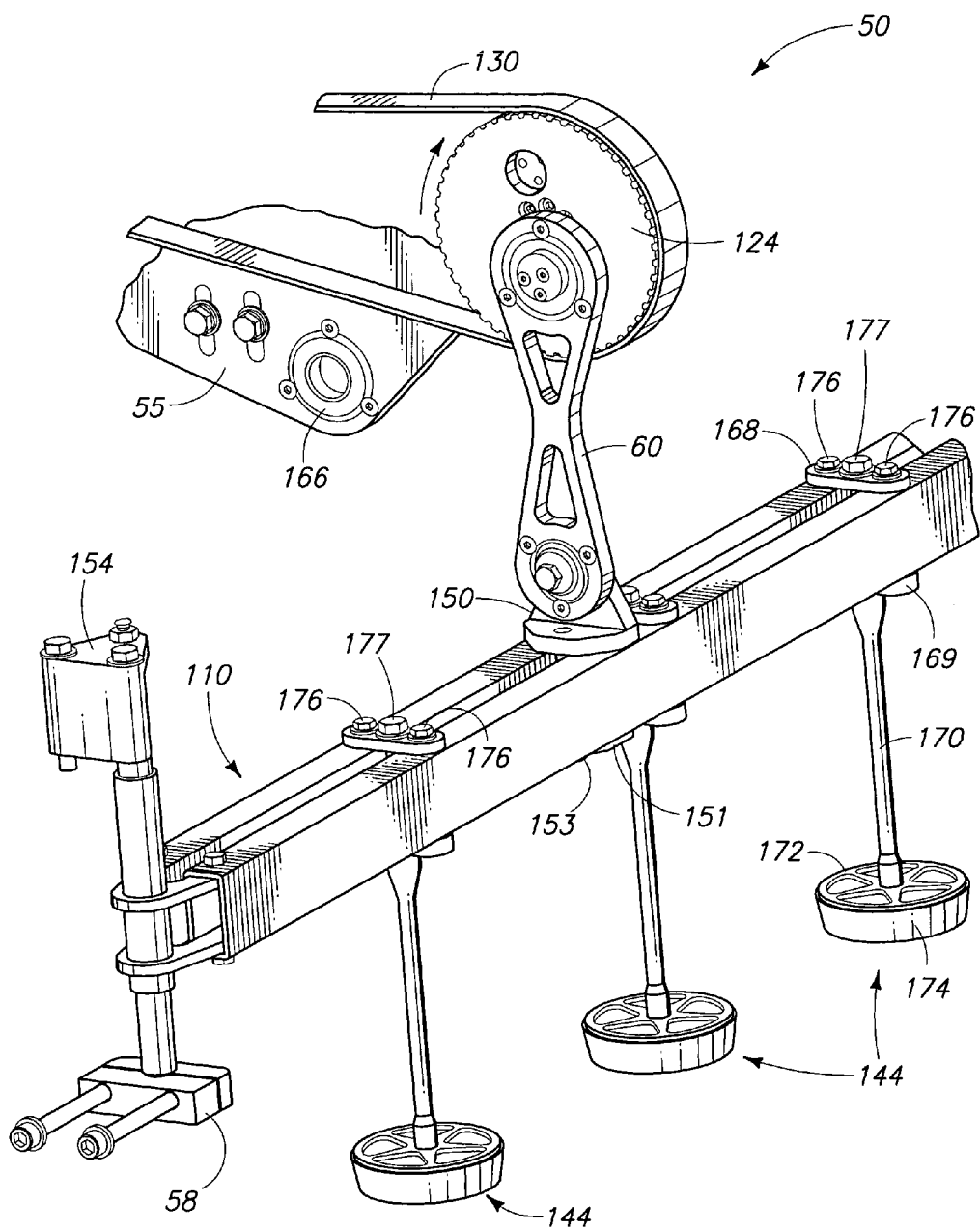
FIG. 6 is a further enlarged perspective view taken within the encircled region 6 of FIG. 5 and further illustrating the ejector bridge and ejector paddle assemblies of the article ejector.

As shown in FIG. 6, crank arm 60 is connected via a pivotal bearing assembly to angle bracket 150. Angle bracket 150 is affixed to a top edge of ejector bridge 110 using a plate 151 and a threaded bolt 153. Engagement of threaded bolt 153 draws together a bracket 150 and plate 151 so as to rigidly affix bracket 150 atop ejector bridge 110.

Figure 9:
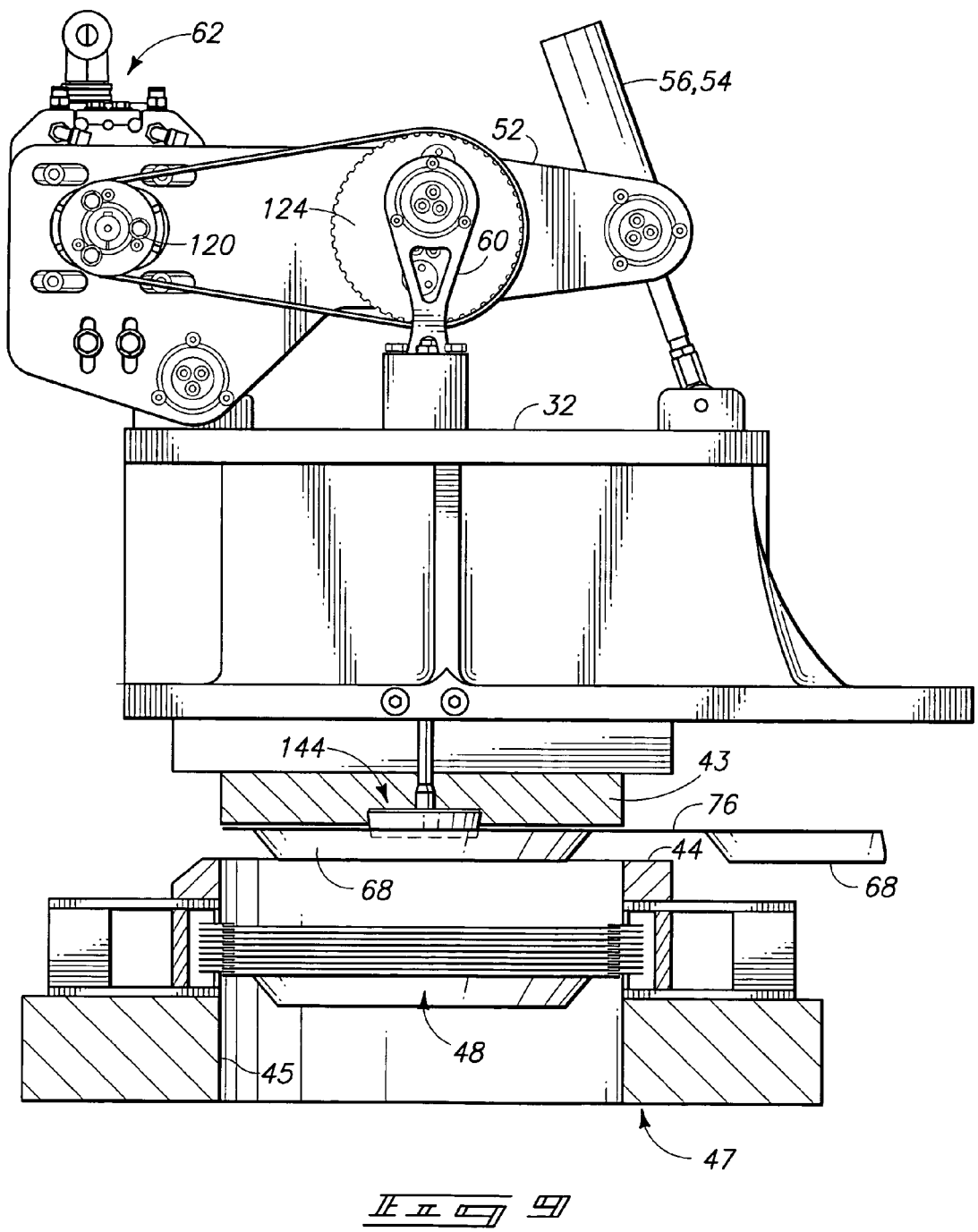
FIG. 9 is a simplified side view of the article ejector of FIGS. 1–6 and illustrating positioning of the article ejector prior to severing and ejecting the article into a stack of articles within an article accumulator provided below within the female die.

FIG. 9 illustrates the position of article ejector 50 when used under a first operating condition for ejecting articles 68 that have been severed between die 43 and female die 44 for stacking such severed articles on top of stack 48 within cavity 45 of an article accumulator 47. As shown in FIG. 9, frame 52 is elevated via pneumatic cylinders 54 and 56 to the shown operating position.

FIG. 10 illustrates rotation of pulley 124 from a 12:00 o'clock position shown in FIG. 9 to a 6:00 o'clock position shown in FIG. 10 which downwardly drives crank arm 60 and moves from a highest, most elevated position of ejector paddle assembly 144 in FIG. 9, to a lowest-most position in FIG. 10. By decrementing the timing of when ejector paddle assembly 144 reaches its lower-most position (corresponding with the position shown in FIG. 11), relative to when platen 32 starts to move up, the final resting position of an article 68 can be modified.

For example, if 50 plates are being stacked within accumulator 47, the time at which ejector paddle assembly 144 places a paddle at a bottom-most position can be varied to a point in time when upper platen 32 has been raised a quarter inch. Accordingly, such a position may correspond with a relatively large stack of articles, such as a count of 50 articles being stacked within cavity 45. In contrast, if only 25 articles are being stacked, the bottom-most position of the paddle on ejector paddle assembly 144 can be timed to occur when upper platen 32 is at a lowest-most position of travel along the trim press.

Further optionally, as each successive article 68 is added onto a stack 48, it is possible to decrement the time at which the paddle on ejector paddle assembly 144 reaches a bottom-most stroke position later in time from the point at which upper platen 32 reaches the lowest-most position. Hence, subsequent articles 68 are downwardly ejected onto stack 48 later in time such that later articles are stacked with the paddle as the upper platen 32 has begun to start moving upwardly from its lowest-most position.

FIG. 11 illustrates an alternative operating condition for article ejector 50 wherein pneumatic cylinders 54 and 56 are retracted, or shortened, so as to downwardly pivot frame 52 which lowers the center position of pulley 124 to further lower the crank position of crank arm 60. The net effect is that ejector paddle assembly 144 is further lowered within cavity 45. Accordingly, pulley 124 can be rotated to downwardly drive crank arm 60 in combination with shortening of pneumatic cylinders 54 and 56 to more deeply drive the paddle of ejector paddle assembly 144 downwardly a maximal amount within cavity 45 so as to clean out web material 76 that is inadvertently lodged within cavity 45 during a cleanout operation. Such a cleanout operation is only done when an operator discovers that web 76 has become damaged or caught between die members 43 and 44, or when damaged articles 68 have been jammed within cavity 45.

As previously stated, by adjusting the timing of servo 62 to adjust the timing when ejector paddle assemblies 144 reach a bottom-most position relative to the time when the upper platen is at a lowest-most position, the maximum relative position of a bottom end of the respective paddle relative to the female die and article cavity varies. By retarding the timing such that the paddle reaches a maximum bottomed-out condition as the upper platen starts to move away, the relative position of an article is not pushed as far down as if the bottom-most position of the paddle corresponds with the bottom-most position of the upper platen. By incrementally increasing the retardation time when the paddle reaches a bottom-most position, but when the upper platen is concurrently starting to move up, the depth to which an article is downwardly driven can be reduced incrementally. Accordingly, a control scheme can be implemented wherein increasing numbers of articles in a stack dictate that the retardation time therebetween is reduced or eliminated. For the case where a relatively small stack is being accumulated, a greater retardation time may be desirable.

A trim press having an article ejector is provided with a kinematic linkage having a crank driven by a rotary mechanism that rotates continuously in one circular direction to drive the crank arm and at least one corresponding ejector paddle in reciprocating motion to eject articles from between a pair of mating male and female dies after severing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A trim press article ejector, comprising:
   a base;
   an articulating frame carried by the base;
   an actuator coupled with the frame and operative to move the frame between extended and retracted positions relative to the base; and
   an article ejector carried by the frame and having at least one paddle movable to and fro to eject articles from a trim press die;
   wherein the extended position of the frame places the article ejector in an article stacking position and the retracted position of the frame places the article ejector in a clean out position.

2. The trim press article ejector of claim 1 wherein the base comprises a trim press patent having at least one male die, and further comprising a second trim press platen having at least one female die.

3. The trim press article ejector of claim 2 further comprising an article accumulator having a cavity communicating with each of the female dies.

4. The trim press article ejector of claim 1 wherein the actuator comprises a cylindrical drive wheel configured to rotate in a first direction, a crank arm pivotally mounted at a location offset from a center pivot point of the wheel, and a paddle pivotally mounted at an opposite end of the crank arm to drive the paddle to and fro along a drive axis.

5. The trim press article ejector of claim 4 further comprising a servo motor coupled with the wheel to rotate the wheel in the first direction and drive the paddle to and fro.

6. The trim press article ejector of claim 5 wherein the article ejector comprises at least one pneumatic cylinder and at least one pivot bearing assembly spaced from the pneumatic cylinder, the pneumatic cylinder and the at least one pivot being provided between the base and the articulating frame, wherein extension and retraction of the pneumatic cylinder relative to the base rotates the articulating frame relative to the base.

7. A method of stacking and cleaning out thermoformed articles, comprising:
   providing a trim press having a first platen with at least one male die and a second platen with at least one female die, the first and second platens movably supported to and fro therebetween, an article ejector supported on the first platen via an articulating frame, and an article accumulator having at least one cavity communicating with the female dies;
   positioning the articulating frame in a first position corresponding with the article accumulator configured in an article stacking position;
   stacking one or more articles by reciprocating the article ejector to and fro while the articulating frame is in the first position;
   positioning the articulating frame in the second position corresponding with the article accumulator configured in a clean-out position; and
   cleaning out the at least one cavity of the article accumulator by reciprocating the article ejector to and fro while the articulating frame is in the second position.

8. The method of claim 7 further comprising while successively stacking articles, successively decrementing timing when the article ejector is reciprocated relative to initiation of the first platen and the second platen being moved away from one another.

9. The method of claim 8 wherein, during stacking of articles, the article ejector is initially extended a maximum distance corresponding with mating of the first die and the second die, and wherein the article ejector is subsequently extended to a maximum distance later in time relative to the time at which the first die and the second die are engaged when stacking a subsequent article.

10. A trim press, comprising:
    a first platen having at least one male die;
    a second platen having at least one female die;
    an article accumulator having a cavity communicating with the female die; and
    an article ejector having an articulating frame supported by one of the first platen and the second platen and a flywheel drive mechanism configured to rotate in a continuous forward direction with an offset crank arm configured to drive at least one ejector paddle in reciprocation to an fro to eject articles from the female die into the cavity in a first mode of operation, the articulating frame movable between extended and retracted portions relative to the one of the first platen and the second platen to position the flywheel drive mechanism and the ejector paddle.

11. The trim press of claim 10 wherein the article ejector is further configured to reciprocate to and fro to clean out articles from the female die and cavity in a second mode of operation.

12. The trim press of claim 10 wherein the first mode of operation for the article ejector imparts a first stroke distance for the at least one ejector paddle corresponding with the articulating frame provided in the extended position and the second mode of operation for the article ejector imparts a second stroke distance for the at least one ejector paddle corresponding with the articulating frame provided in the retracted position.

13. The trim press of claim 10 wherein the extended position of the articulating frame corresponds with a first position and the retracted position of the articulating frame corresponds with a second position.

14. The trim press of claim 13 wherein the first position places the article ejector in the first mode of operation and the second position places the article ejector in a second mode of operation.

15. The trim press of claim 14 wherein the first mode of operation comprises an article stacking mode of operation and the second mode of operation comprises a female die and cavity clean-out mode of operation.

16. The trim press of claim 15 wherein the first position configures the article ejector to drive the at least one paddle to a deepest-most position relative to the female die and cavity at a first depth and the second position configures the article ejector to drive the at least one paddle to a deepest-most position relative to the female die and cavity at a second depth greater than the first depth.

17. The trim press of claim 10 wherein the flywheel drive mechanism comprises a pair of wheels coupled together via a central drive shaft and a pair of crank arms pivotally mounted at a position offset from a center pivot of each pulley.

18. The trim press of claim 17 further comprising an ejector bridge guided for axial reciprocation and coupled to each crank arm at a distal end, with at least one ejector paddle assembly mounted to the ejector bridge.

19. An article ejecting device, comprising:
    a platen;

an articulating frame supported by the platen so as to articulate relative to the platen between an article stacking position and an accumulator cavity clean-out position;

an article ejector mechanism movably carried by the frame between a retracted position and an extended position; and a frame moving mechanism configured to move the frame and the article ejector mechanism relative to the platen between the article stacking position and the accumulator cavity clean-out position.

20. The article ejecting device of claim 19 wherein the article ejector mechanism comprises a kinematic linkage with an ejector paddle, the kinematic linkage configured to change a maximum position of the ejector paddle when in the article stacking position versus the accumulator cavity clean-out position.

21. The article ejecting device of claim 19 wherein the article ejector mechanism comprises a flywheel drive mechanism.

22. The article ejecting device of claim 21 wherein the flywheel drive mechanism comprises a pair of wheels mounted for rotation on the articulating frame and journaled together via a common shaft, an ejector bridge driven to and fro for axial reciprocation via at least one guide post and slidable bushing, and at least one ejector paddle affixed to the ejector bridge for axial movement to and fro.

23. The article ejecting device of claim 22 wherein the article ejector mechanism comprises a pair of crank arm, each pivotally mounted at a location offset from a center point on a respective one of the pair of wheels.

24. The article ejecting device of claim 23 wherein the article ejector mechanism comprises an ejector bridge affixed to an opposite end of the crank arm and driven to and fro for axial reciprocation via at least one guide post and a slidable bushing, and at least one ejector paddle carried by the ejector bridge that is driven in axial movement to and fro.

25. The article ejecting device of claim 19 wherein the platen comprises a first platen having at least one male die, and further comprising a second platen supported in association with the first platen such that relative to and fro motion is imparted between the first platen and the second platen, the second platen further comprising at least one female die, and further comprising a cavity provided in association with each of the at least one female dies, and an article accumulator communicating with each of the cavities.

26. The article ejecting device of claim 19 wherein the article ejector mechanism comprises at least one flywheel, a crank arm mounted in an offset location on the flywheel, a paddle mounted at an opposite end of the crank arm, and a servo motor configured to drive the flywheel in full rotation in a first direction so as to drive the crank arm and move the paddle in reciprocating motion to and fro in a first mode of operation and a second mode of operation.

27. The article ejecting device of claim 19 wherein the first mode of operation corresponds with the pneumatic cylinders being extended so as to raise the articulating frame, and wherein the second mode corresponds with retraction of the pneumatic cylinders so as to lower the articulating frame.

28. An article ejecting device, comprising:

a platen;

an articulating frame carried for movement by the platen between an article stacking position and an article ejecting position;

an article ejector mechanism movably carried by the frame between a retracted position and an extended position; and a frame moving mechanism configured to move the frame and the article ejector mechanism between an article stacking position and an accumulator cavity clean-out position;

wherein the frame moving mechanism comprises a pair of pneumatic cylinders mounted between the platen and the articulating frame and a pair of pivot bearing assemblies spaced from the pneumatic cylinders and mounted between the platen and the articulating frame, wherein extension and retraction of the pneumatic cylinders raises and lowers, respectively, the articulating frame relative to the platen so as to raise and lower the article ejector mechanism.

29. The article ejecting device of claim 28 wherein the article ejector mechanism comprises at least one flywheel, a crank arm mounted in an offset location on the flywheel, a paddle mounted at an opposite end of the crank arm, and a servo motor configured to drive the flywheel in full rotation in a first direction so as to drive the crank arm and move the paddle in reciprocating motion to and fro in a first mode of operation and a second mode of operation.

30. The article ejecting device of claim 28 wherein the first mode of operation corresponds with the pneumatic cylinders being extended so as to raise the articulating frame, and wherein the second mode corresponds with retraction of the pneumatic cylinders so as to lower the articulating frame.

* * * * *